United States Patent
Flynn

(10) Patent No.: US 9,736,466 B2
(45) Date of Patent: Aug. 15, 2017

(54) OPTIMIZING STEREO VIDEO DISPLAY

(75) Inventor: Mark F. Flynn, San Jose, CA (US)

(73) Assignee: zSpace, Inc., Mountain View, CA (US)

( * ) Notice: Subject to any disclaimer, the term of this patent is extended or adjusted under 35 U.S.C. 154(b) by 699 days.

(21) Appl. No.: 13/481,243

(22) Filed: May 25, 2012

(65) Prior Publication Data

US 2012/0300036 A1    Nov. 29, 2012

Related U.S. Application Data

(60) Provisional application No. 61/491,052, filed on May 27, 2011.

(51) Int. Cl.
*H04N 13/04* (2006.01)
*H04N 13/00* (2006.01)

(52) U.S. Cl.
CPC ..... *H04N 13/0438* (2013.01); *H04N 13/0025* (2013.01)

(58) Field of Classification Search
None
See application file for complete search history.

(56) References Cited

U.S. PATENT DOCUMENTS

| | | | |
|---|---|---|---|
| 5,089,882 A * | 2/1992 | Kaye et al. | 348/645 |
| 6,243,055 B1 * | 6/2001 | Fergason | G02B 5/3083 345/32 |
| 7,898,519 B2 | 3/2011 | Feng | |
| 8,130,325 B2 | 3/2012 | Iwakura et al. | |
| 2006/0078180 A1 | 4/2006 | Berretty et al. | |
| 2007/0052643 A1 * | 3/2007 | Li | G09G 3/2007 345/89 |
| 2007/0146479 A1 * | 6/2007 | Huang | G06T 1/20 348/51 |
| 2008/0100749 A1 * | 5/2008 | Kondo | G06K 9/4619 348/687 |
| 2009/0046104 A1 | 2/2009 | Boiko | |
| 2009/0189925 A1 | 7/2009 | Huang et al. | |
| 2010/0157032 A1 * | 6/2010 | Park | H04N 13/0434 348/57 |
| 2010/0309381 A1 * | 12/2010 | Nakagawa | H04N 13/0438 348/705 |

* cited by examiner

*Primary Examiner* — William C Vaughn, Jr.
*Assistant Examiner* — Stuart Bennett
(74) *Attorney, Agent, or Firm* — Meyertons Hood Kivlin Kowert & Goetzel, P.C.; Jeffrey C. Hood; Brian E. Moore

(57) ABSTRACT

System and method for video processing. First video levels for pixels for a left image of a stereo image pair are received from a GPU. Gamma corrected video levels (g-levels) are generated via a gamma look-up table (LUT) based on the first video levels. Outputs of the gamma LUT are constrained by minimum and/or maximum values, thereby excluding values for which corresponding post-OD display luminance values differ from static display luminance values by more than a specified error. Overdriven video levels are generated via a left OD LUT based on the g-levels. The overdriven video levels correspond to display luminance values that differ from corresponding static display luminance values by less than the error threshold, and are provided to a display device for display of the left image. This process is repeated for second video levels for a right image of the stereo image pair, using a right OD LUT.

21 Claims, 13 Drawing Sheets

OPTIMIZING STEREO VIDEO DISPLAY

PRIORITY DATA

This application claims benefit of priority to U.S. Provisional Application Ser. No. 61/491,052, titled "Three Dimensional Presentation Development System", filed May 27, 2011, whose inventors are David A. Chavez, Mark F. Flynn, Douglas C. Twilleager, and Michael A. Vesely, which is hereby incorporated by reference in its entirety as though fully and completely set forth herein.

TECHNICAL FIELD

This disclosure relates to the field of digital display, and more particularly to optimizing stereo video processing, e.g., for (simulated) 3D (three dimensional) display.

DESCRIPTION OF THE RELATED ART

Three dimensional (3D) displays (actually, simulated 3D, e.g., via stereo display (SD) techniques) are increasingly utilized for a variety of applications, including, for example, remote viewing, videoconferencing, video collaboration, and so forth.

FIG. 1 illustrates a modern display chain, according to typical embodiments, which includes the following components:

1. GPU—Graphics Processing Unit. This component resides on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255.

3. Panel—This component is the display itself, typically a liquid crystal display (LCD), but other displays are possible, and takes as input the video levels (e.g., for R, G and B) for each pixel as output from the scaler, and converts them to voltages, which are then delivered to each pixel on the display. The panel itself may modify the video levels before converting them to voltages.

The video chain generally modifies the video levels in two ways that have associated shortcomings for stereo displays, specifically, gamma correction, and overdrive. Note that the functionality described above is typically implemented in the scaler, but is sometimes implemented at least partially in other devices or elements of the video chain, e.g., in the GPU or display device (panel).

Gamma

As used herein, the "gamma" process refers to a look-up table (LUT) which maps input levels to output levels, and its use, as is well known to those of skill in the art. FIG. 2 illustrates a typical gamma curve, per the prior art. Note that in this figure the concept of normalized video levels which span a range of 0 to 1 is used. To convert these values to a specific range (in this case from 0 to 255), one simply multiplies the normalized video level by the maximum of the range. For example, a normalized video level 0.5 scales to a video level of 128 (after rounding).

Overdrive

In the context of video processing and display, overdrive (OD) is a technique used to compensate for the finite response time of a display. This is of particular importance in LCDs, where the amount of light emitted by a pixel is controlled by a voltage, but is modified by the viscous properties of the liquid crystal (LC) material within the pixel. In other words, modern LC displays (LCDs) generally use overdrive to partially compensate for slow response times of the LC material in the LCD itself. This behavior can be used to provide the necessary responsiveness, and can be implemented in the LCD system as a table, e.g., a look-up table (LUT), referred to as an "overdrive table" (OD table), which maps all input video levels to the output level which comes closest to the desired optical response for that input level.

In the descriptions herein, time is measured in units of frames. A frame of time is the time for which one set of pixel data is shown on the display panel (of a display device). For a non-SD (non-stereo display), these data are typically updated at a rate of 60 Hz, which produces a frame time of $\frac{1}{60}$=0.0166 seconds, or 16.6 ms. For a time-sequential stereoscopic display, this is typically doubled to 120 Hz, so that a full left and a full right image can be shown at a rate of 60 Hz. In this case, the frame time is 8.3 ms.

FIG. 3 illustrates an example of the effect of slow LC response time, where a plot of luminance values vs. time (in frames) is presented. As shown, at time 0, the voltage switches from that for level 0 to that for level m. As may be seen, it takes more than two frames for the optical output (measured in Luminance (L)) to rise to a steady state value of 0.6 (again, in normalized units). The value achieved at the end of 1 frame is only 0.3, or about a factor of 2 too low. FIG. 4 shows an additional curve, illustrating the response for an additional level m. Note that its static level is higher than that of m, as it saturates at an L value of about 0.68; however, note further that at the end of one frame it happens to achieve the static level of m. Thus, if the panel were driven to level m instead of to m, an adequate luminance level could be reached by the end of one frame.

The reason that the value at the end of the frame is so important is that, typically (and especially for SDs), the video level can change at the end of a frame, in which case the luminance level will never reach the static level.

The notion of frame-averaged luminance level should be mentioned. What really matters to the user is the total luminance level averaged over one frame. For traditional LCDs, the backlight is on all of the time, and so the frame-averaged luminance level (referred to as L(m) for video level m) is just the optical response luminance values averaged over one frame. Other possibilities are also possible; for example, it is common in time-sequential SDs to pulse the backlight for a short period of time (about 1 ms) at the very end of a frame, and to have the backlight off for the rest of the frame. In this case, L(m) is calculated the same way, but the averaging is only done over the time when the backlight is on.

This process can be expressed as an equation:

$$L(m) = \int_0^1 b(t) l(t,m) dt \tag{1}$$

where b(t) is the normalized time-dependent backlight luminance value (0=off, 1=full on), and l(t,m) is the time-dependent normalized luminance value of the pixel when driven to video level m. L(m) is the luminance value of a pixel driven to video level m, averaged over one frame, weighted by the backlight intensity during the frame. Turning now to FIG. 5, it will now be shown that the above approach is not sufficient to explain what is actually occurring.

The first part of this plot (of FIG. 5) is directed to Frame 1, where the pixel shows the static luminance value over time for a video level m, which can be seen is a flat line, indicated by the Static L(m) portion of the plot. In Frame 2, the pixel voltage changes to that of a new video level n. This transition is very quick, and so the luminance value reaches the static level L(n). In Frame 3, the pixel switches back to level m. This is a very slow transition, as can be seen by the shape of the curve, and therefore the luminance value never reaches L(m) before it is switched again to video level n at the beginning of the next frame. The quantity L(m,n) is now defined as the time-averaged luminance value when the pixel is switched to video level m, when it was in video level n in the previous frame. As may be seen, L(m,n) does not equal L(m) for all values of n, which may present a real problem for display performance. When the pixel is switched to video level m, L(m) is expected, but L(m,n) is what actually results. In other words, the resulting pixel behavior depends on what video level is being switched to, and what video level is being switched from.

This is where OD becomes relevant. As seen in FIG. 4, it may be possible to switch to another level m', rather than m, and still achieve the desired luminance. This, too, can be expressed as an equation:

$$L(m',n)=L(m) \qquad (2)$$

Now, it is desirable that this be true for all n, which can be accomplished by defining a 2 dimensional LUT OD(m,n), which can be defined via the following equations:

$$L(OD(m,n),OD(n,m))=L(m) \qquad (3)$$

$$L(OD(n,m),OD(m,n))=L(n) \qquad (4)$$

In other words, rather than switching between levels m and n, one may switch between levels OD(m,n) and OD(n,m) in order to achieve the desired static luminance levels L(m) and L(n).

From the above equations, one can define an error function for each level (m, n), e.g.,:

$$\Delta(m, n) = 200 * \frac{L(OD(m, n), OD(n, m)) - L(m)}{L(OD(m, n), OD(n, m)) + L(m)} \qquad (5)$$

This is the percentage error of each dynamic level luminance L(m,n) relative to the average of the static level L(m) and the dynamic level L(m,n). A well designed OD LUT should minimize this error function for all values of (m,n).

There are many different ways of trying to satisfy these equations, including the following exemplary approaches:

First, these equations could be solved by trial and error. One could show various test images, showing various video levels (m,n) on the screen, and compare these via visual inspection, e.g., "by eye", to the corresponding images for the static video levels m. The OD entries could be adjusted by hand to achieve the best match of perceived luminance values.

A improvement to this approach involves measuring the corresponding video level luminance values, L(m,n) and L(m), and adjusting the OD entries to minimize the error function.

A third way is to do the above for some subset of the points, and then use interpolation to determine the remaining OD entries.

Note that in the above description, R, G, and B (sub-) pixels have not been discussed, but rather, just "the pixel"; however, generally there can be three gamma LUTs, and three separate OD LUTS, one of each for each color (sub-pixel), and they are at least close to operating independently. Thus, in some embodiments, there may be a gamma LUT and an OD LUT provided for each color, e.g., for each type of sub-pixel.

Time Sequential Stereo Displays

Unlike a normal display, in a stereo display, there are two images—right and left. The right image must be delivered to only the right eye, and the left image must be delivered to only the left eye. In a time sequential stereo display, this separation of right and left images is performed in time, and thus, it must contain some time-dependent element which separates these two images. There are two common architectures.

The first architectures uses a device called a polarization switch (PS) which may be a distinct (separate) or integrated LC device or other technology switch, which is placed in front of the LCD panel (or any other type of imaging panel, e.g., an OLED (organic led emitting diode) panel), a plasma display, etc., or any other pixelated panel display used in a time-sequential stereo imaging system, specifically, between the LCD panel and the viewer, as shown in FIG. 6. The purpose of the PS is to switch the light between two orthogonal polarization states. For example, one of these states may be horizontally linearly polarized light (horizontal linear polarization state), and the other may be vertically linearly polarized light (vertical linear polarization state); however, other options are possible, e.g., left and right circular polarization states, etc., the key feature being that the two polarization states are orthogonal.

This allows achievement of the stereo effect shown in FIG. 7. As may be seen, the top portion of the figure shows the (display) panel switching between a left image and a right image. Synchronous with this, the PS is switching between a Left State and a Right State. These states emit two orthogonal polarization states, as mentioned above. The stereo eyewear is designed such that the left lens will only pass the Left State polarization, and the right lens will only pass the Right State polarization. In this way, separation of the right and left images is achieved.

In 3D display systems that rely on polarization switching to deliver distinct images to a user's left and right eyes, e.g., via polarized eyewear, the response time of the PS can also be problematic. More specifically, in addition to the slow LC response of the LCD, overall performance of the system may suffer do to the slow LC response time of the polarization switch (PS), and the optical leakage due to the non-perfect nature of the polarization control in the PS and the eyewear, where these effects depend on which eye us being used to view the display.

The second conventional architecture uses stereo shutter glasses, which replace the PS and eyewear. In this system, each eye is covered by an optical shutter, which can be either open or closed. Each of these shutters is opened and closed synchronously with the panel display in such a way that when the left image is shown on the display, only the left eye shutter is open, and when the right image is shown on the display, only the right eye shutter is open. In this manner, the left and right views are presented to the user's left and right eyes, respectively.

However, as used in prior art systems, both of these architectures may have performance issues. Therefore, improved techniques for video display are desired.

SUMMARY

Embodiments of a system and method for optimizing video display are presented.

In one embodiment, a left OD LUT (overdrive look-up table) and a right OD LUT may be provided (e.g., received from a memory, another component, a server, mass storage, etc.). In some embodiments, the left and right OD LUTs may be generated. In other words, values or entries for left and right OD LUTs for use in video display may be determined, and the tables populated accordingly. The tables may be generated via any of a variety of techniques, discussed below.

Left and right images of a stereo image pair may be displayed (e.g., simultaneously, or in succession), where the left image is displayed using the left OD LUT, and the right image is displayed using the right OD LUT. In other words, the method may switch between the two OD LUTs such that when the system (or method) displays a left image, the system (or method) uses the left OD LUT, and when this system (or method) displays a right image, the system (or method) uses use the right OD LUT.

Successive left and right images may be displayed repeatedly in an iterative manner, e.g., with successive stereo image pairs. The use of the left and right OD LUTs may improve performance of the system in that overdrive is optimized per eye (or per stereo visual channel).

In another embodiment, a gamma LUT (gamma look-up table) may be provided (or received). As with the above method, in some embodiments, the method may further include generating the gamma LUT. In other words, values or entries for the gamma LUT for use in video display may be determined, and the table populated accordingly.

In one embodiment, the gamma LUT may map input video levels to gamma corrected video levels, where the gamma corrected video levels of the gamma LUT are constrained by a specified minimum value or a specified maximum value, thereby excluding values for which corresponding post-OD display luminance values differ from static display luminance values by more than a specified error threshold.

First video levels for a plurality of pixels for an image may be received, e.g., by a video processing component, e.g., from a GPU. The video processing component may be implemented by or included in any of the devices or elements of the video chain, including one or more of the GPU, video scaler, or display device (e.g., display panel), or even a standalone device, among others, as desired.

First gamma corrected video levels may be generated (or determined) via the gamma LUT based on the first video levels. For example, the first video levels may be used as input to the gamma LUT, and the first gamma corrected video levels determined via table look-up (using the gamma LUT). The first gamma corrected video levels may correspond to post-OD corrected display luminance values that differ from corresponding static display luminance values by less than the specified error threshold. Additionally, since the gamma LUT excludes values for which corresponding post-OD display luminance values differ from static display luminance values by more than the specified error threshold, the first gamma corrected video levels may be used as "safe" or "effective" inputs to an OD table, i.e., outputs from the OD table based on the first gamma video levels (as input) may be guaranteed to correspond to display luminance values that differ from corresponding static display luminance values by less than the specified error threshold. Thus, the first gamma corrected video signals may be useable for optimized video display.

The receiving and generating method elements may be repeated in an iterative manner, e.g., with successive images (or, more specifically, video levels corresponding to successive images), thereby optimizing video display.

In another embodiment, a left gamma LUT (gamma look-up table) and a right gamma LUT may be provided. In some embodiments, the left and right gamma LUTs may be generated. In other words, values or entries for left and right gamma LUTs for use in video display may be determined, and the tables populated accordingly. The tables may be generated via any of a variety of techniques.

Left and right images of a stereo image pair may be displayed (e.g., simultaneously, or in succession), where the left image is displayed using the left gamma LUT, and the right image is displayed using the right gamma LUT. In other words, the method may switch between the two gamma LUTs such that when the system (or method) displays a left image, the system (or method) uses the left gamma LUT, and when this system (or method) displays a right image, the system (or method) uses use the right gamma LUT. For example, in one embodiment, generating first gamma corrected video levels via the gamma LUT based on the first video levels (e.g., by the video processing component) may include generating the first gamma corrected video levels via the left gamma LUT, and generating second gamma corrected video levels via the gamma LUT based on the second video levels may include generating the second gamma corrected video levels via the right gamma LUT. This displaying may be repeated in an iterative manner, e.g., with successive stereo image pairs. The use of the left and right gamma LUTs may improve performance of the system in that gamma correction is optimized per eye (or per stereo visual channel).

In a further embodiment, first video levels for a plurality of pixels for a left image of a stereo image pair may be received, e.g., from a GPU. In one embodiment, the first video levels may be received to a video processing component in a video chain, e.g., to a scaler or other portion(s) of the video chain implementing the video processing component. The video processing component may be included in a display device, e.g., a monitor, in a computer system, or even as a standalone device, as desired, and, as also indicated above, may be implemented in software, e.g., for execution by a processor and memory, or may be implemented in hardware, e.g., an ASIC or programmable hardware element, e.g., an FPGA, or any combination of the above.

First gamma corrected video levels may be (or determined) via a gamma look-up table (LUT) based on the first video levels. Output values of the gamma LUT may be constrained by a specified minimum value or a specified maximum value ("or" is inclusive), thereby excluding values for which corresponding post-OD display luminance values differ from static display luminance values by more than a specified error threshold. Said another way, the first gamma corrected video levels may correspond to post-OD display luminance values that differ from corresponding static display luminance values by less than the specified error threshold.

In other words, since the gamma LUT excludes values for which corresponding post-OD display luminance values differ from static display luminance values by more than a specified error threshold, the first gamma corrected video levels may be used as "safe" or "effective" inputs to an OD table, i.e., outputs from the OD table based on the first gamma video levels (as input) may be guaranteed to correspond to display luminance values that differ from corresponding static display luminance values by less than the specified error threshold. Thus, the first gamma corrected video signals may be useable for optimized video display.

First overdriven video levels may be (or determined) via a left OD LUT based on the first gamma corrected video levels. The first overdriven video levels may correspond to display luminance values that differ from corresponding static display luminance values by less than the specified error threshold.

The first overdriven video levels may be provided to a display device for display of the left image. Note that in this method, the display device may be capable of stereo image display, e.g., for simulated 3D viewing.

Second video levels for the plurality of pixels for a right image of the stereo image pair from the GPU may be received.

Second gamma corrected video levels may be generated (or determined) via the gamma LUT based on the second video levels. As with the first gamma corrected video levels, the second gamma corrected video levels may correspond to post-OD display luminance values that differ from corresponding static display luminance values by less than the specified error threshold.

Second overdriven video levels may be generated (or determined) via a right OD LUT based on the second gamma corrected video levels. As with the first overdriven video levels, the second overdriven video levels may correspond to display luminance values that differ from corresponding static display luminance values by less than the specified error threshold.

The second overdriven video levels may be provided to the display device for display of the right image. The method may repeat the receiving first video levels, the generating first gamma corrected video levels, the generating first overdriven video levels, the providing the first overdriven video levels, the receiving second video levels, the generating second gamma corrected video levels, the generating second overdriven video levels, and the providing the second overdriven video levels, one or more times in an iterative manner to display a sequence of stereo images.

BRIEF DESCRIPTION OF THE DRAWINGS

A better understanding of the present disclosure can be obtained when the following detailed description of the preferred embodiment is considered in conjunction with the following drawings, in which.

Figure 1:
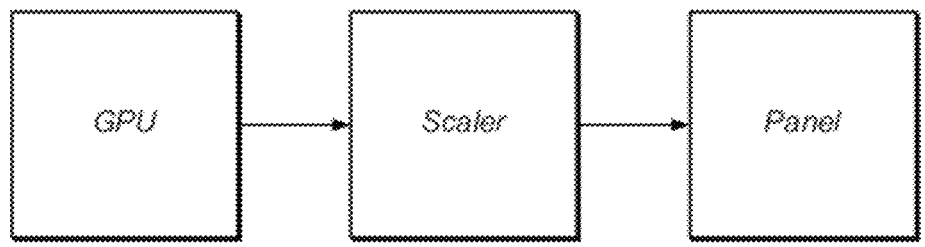
FIG. 1 illustrates a modern display chain, according to the prior art.
Figure 2:
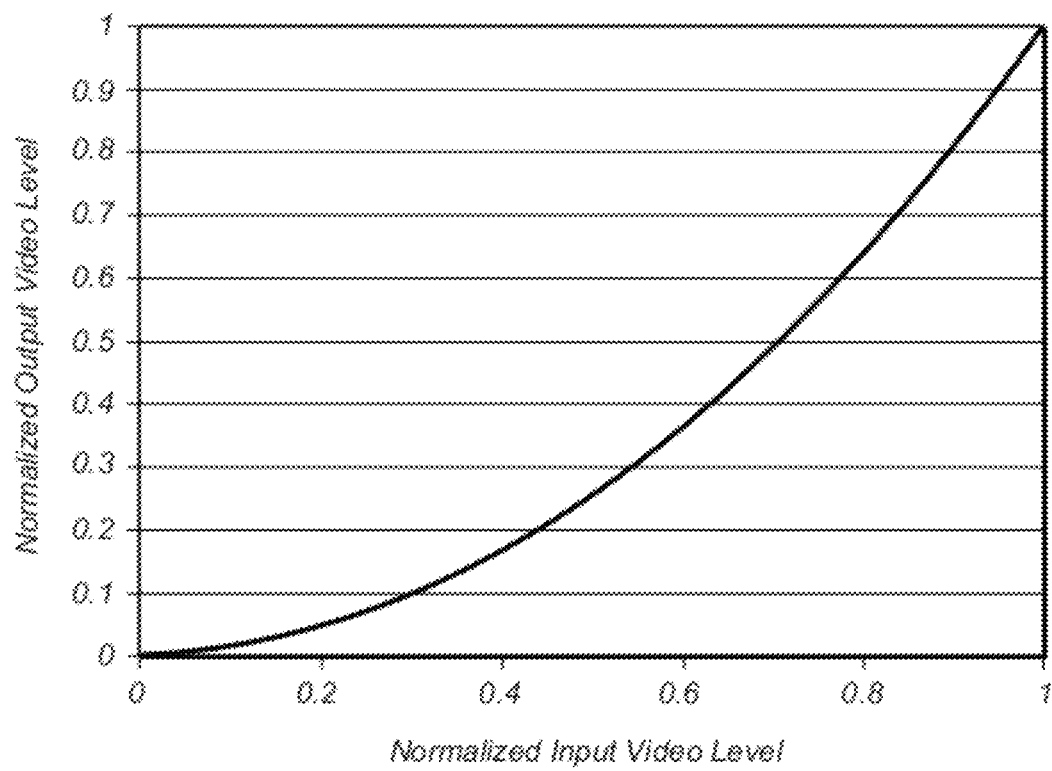
FIG. 2 illustrates a typical gamma curve, according to the prior art.
Figure 3:
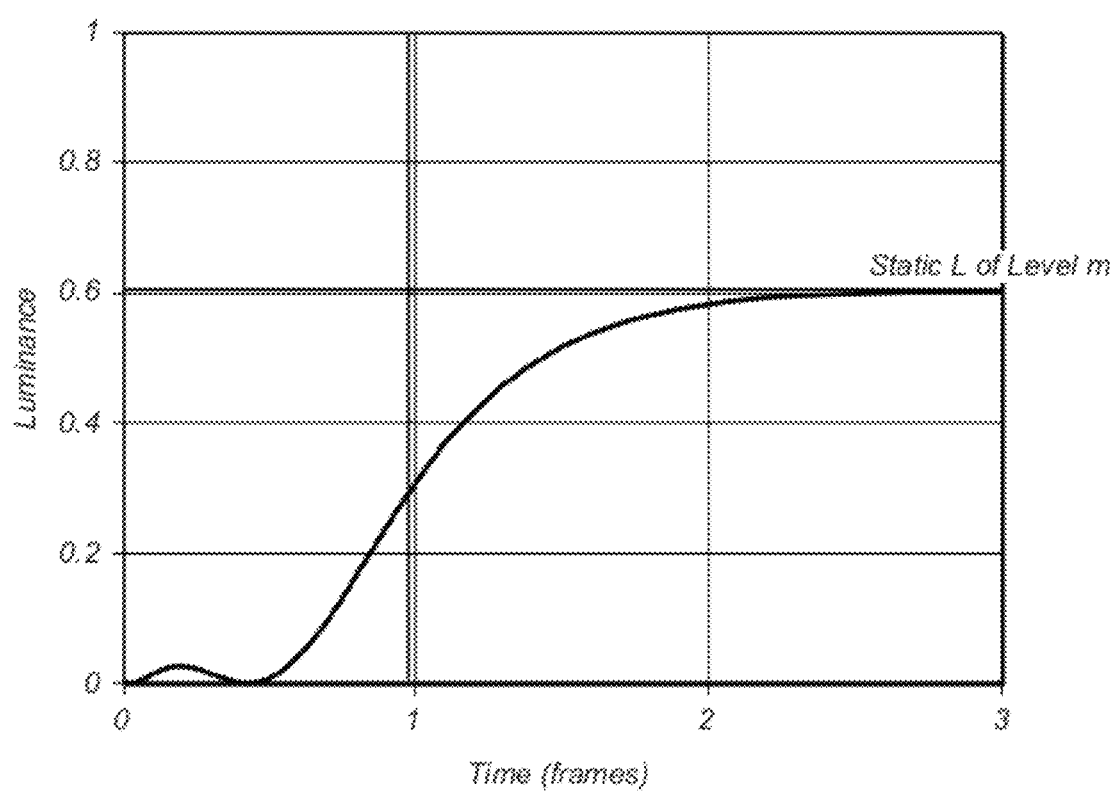
FIG. 3 is a plot of luminance value vs. time that illustrates voltage level switching delays.
Figure 4:
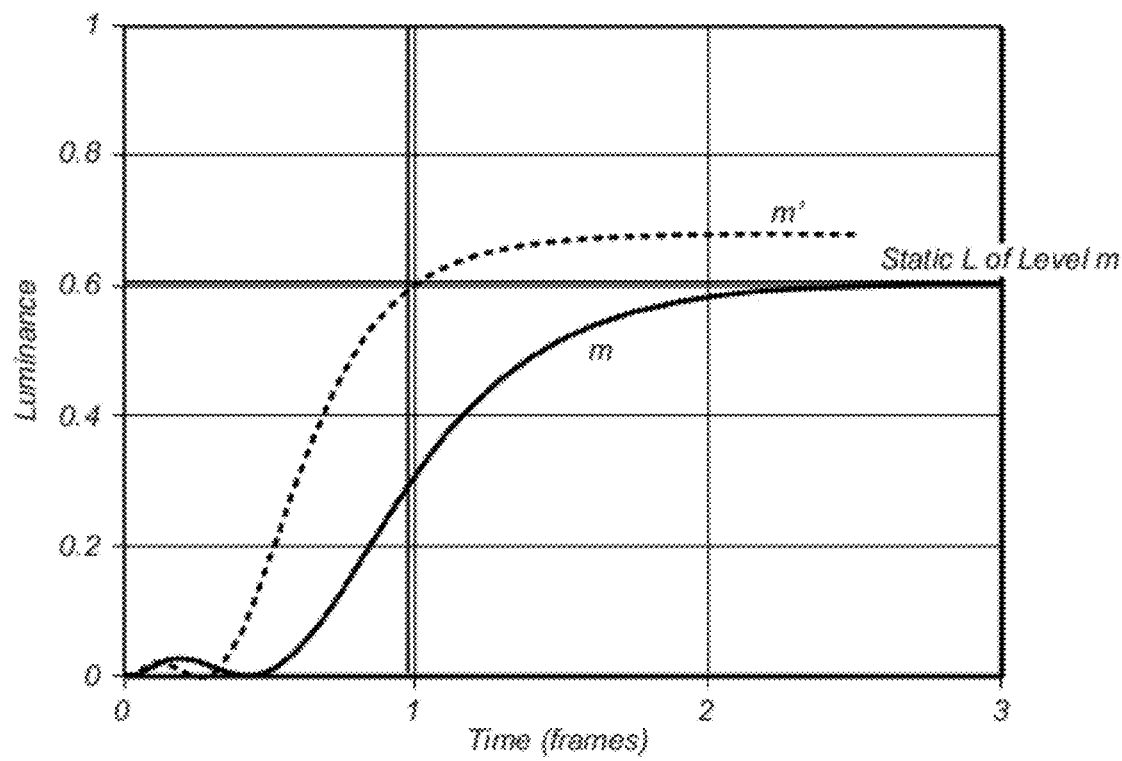
FIG. 4 is a plot of luminance value vs. time that illustrates the use of overdrive to adjust for the slow response time of FIG. 3.
Figure 5:
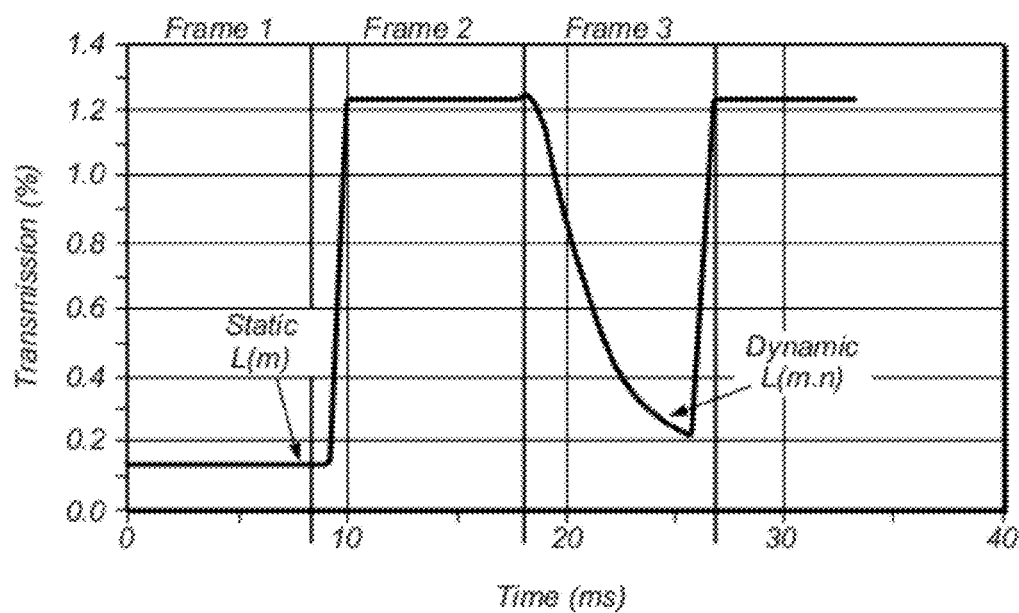
FIG. 5 illustrates switching dependence of time-averaged luminance.
Figure 6:
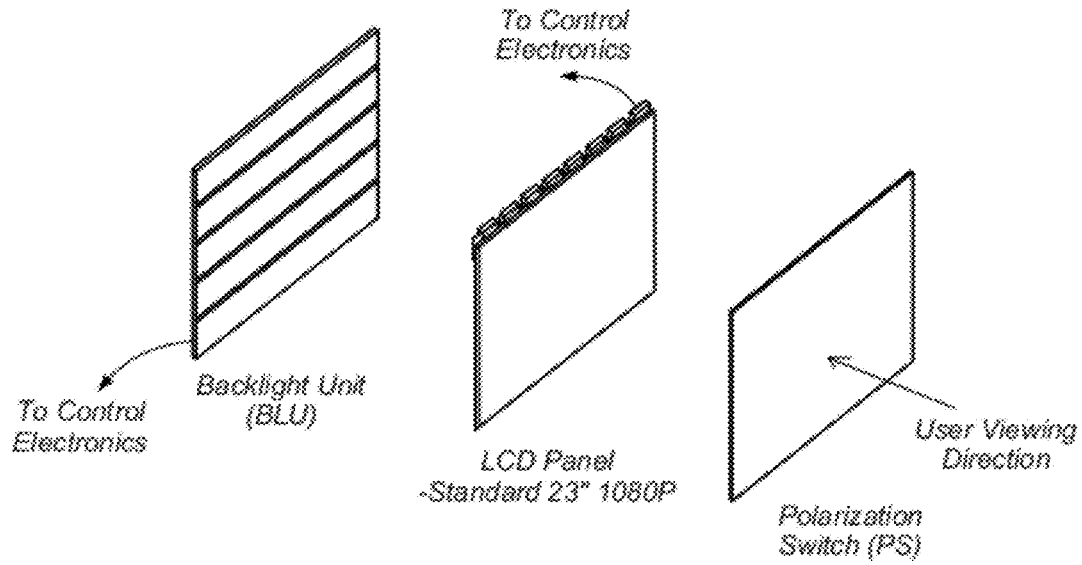
FIG. 6 illustrates an architecture that utilizes a polarization switch, according to the prior art.
Figure 7:
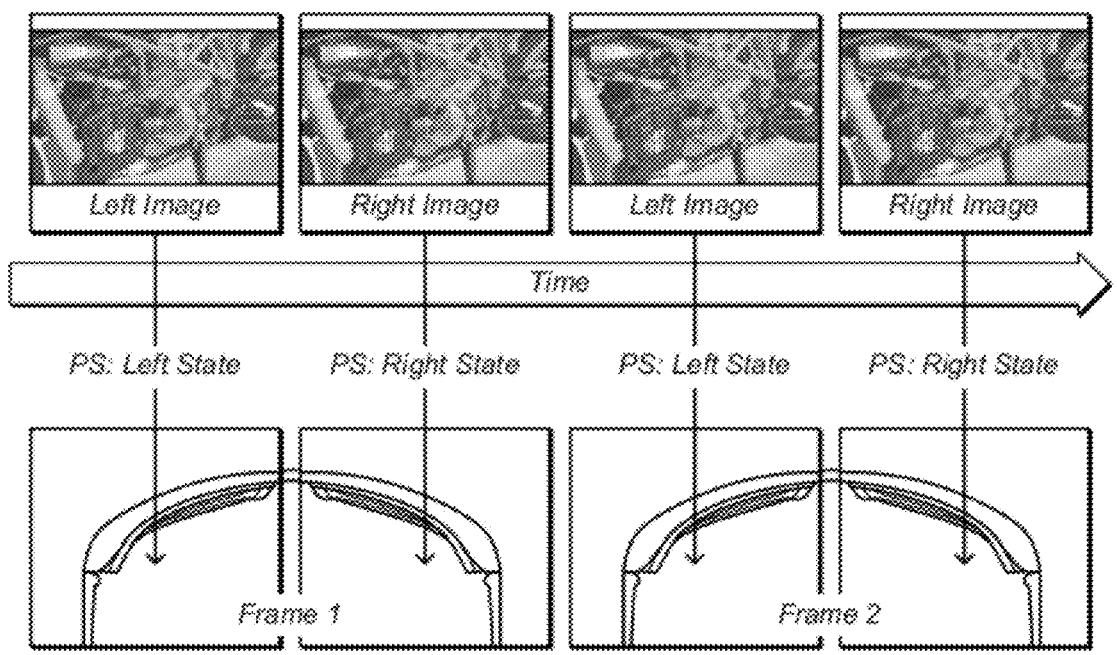
FIG. 7 illustrates a stereo effect (simulated 3D) using polarization switching between left and right views, according to the prior art.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Incorporation by Reference

The following references are hereby incorporated by reference in their entirety as though fully and completely set forth herein:

U.S. Provisional Application Ser. No. 61/491,052, titled "Three Dimensional Presentation Development System", filed May 27, 2011.

U.S. Provisional Application Ser. No. 61/528,457, titled "Head Position and Temperature Based Overdrive Tables", filed on Aug. 29, 2011.

U.S. patent application Ser. No. 11/098,681 (U.S. Patent Publication No. 2005/0219694), titled "Horizontal Perspective Display", filed on Apr. 4, 2005.

U.S. patent application Ser. No. 11/141,649 (U.S. Patent Publication No. 2005/0264858), titled "Multi-plane Horizontal Perspective Display", filed on May 31, 2005.

U.S. patent application Ser. No. 17/797,958, titled "Presenting a View within a Three Dimensional Scene", filed on Jun. 10, 2010.

U.S. patent application Ser. No. 13/110,562, titled "Liquid Crystal Variable Drive Voltage", filed on May 18, 2011.

Terms

The following is a glossary of terms used in the present application:

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Comprising—this term is open-ended. As used in the appended claims, this term does not foreclose additional structure or steps. Consider a claim that recites: "A system comprising a display . . . " Such a claim does not foreclose the apparatus from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 8:
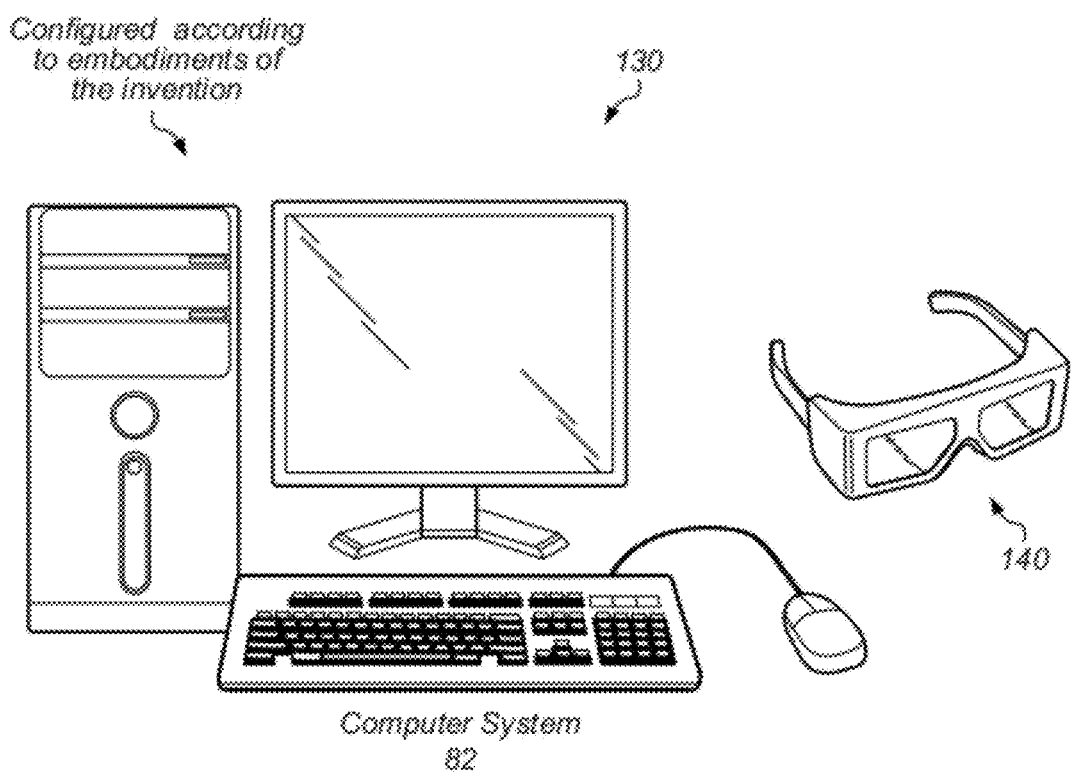
FIG. 8 illustrates an exemplary system configured to implement various embodiments.

FIG. 8—Computer System

FIG. 8 is a high level block diagram of an exemplary system configured to implement various embodiments. As shown in FIG. 8, a computer system 82 may include one or more display devices, including, for example, a "stereo-capable" monitor 130 and stereoscopic (e.g., "3D") eyewear 140, e.g., shutter glasses.

The computer system 82 may include at least one memory medium on which one or more computer programs or software components according to one embodiment of the present invention may be stored. For example, the memory medium may store one or more programs which are executable to perform the methods described herein. The memory medium may also store operating system software, as well as other software for operation of the computer system. In some embodiments, the memory medium may store firmware implementing at least a portion of the techniques described herein. Various embodiments further include receiving or storing instructions and/or data implemented in accordance with the foregoing description upon a carrier medium.

It should be noted that in various other embodiments, the system may be implemented with a workstation, or dedicated hardware (e.g., as opposed to a standard personal computer (PC) or workstation), such as a computing device configured with an ASIC (application specific integrated circuit) or programmable hardware element, e.g., a field programmable gate array (FPGA), among others. Moreover, as explained below, in further embodiments, any of various display techniques and devices may be used as desired, including, for example, stereoscopic display techniques and devices. Similarly, any types of memory may be used as desired, including volatile memory mediums such as RAM, or non-volatile memory mediums, e.g., EEPROMs, e.g., configured with firmware, etc., as desired.

Stereo Look-Up Tables

In time sequential stereo display systems, the presence of a PS may affect the OD LUT entries in two ways. First, remember that the OD LUT is designed to compensate for the slow response time of the LCD (or any other type of pixelated display panel used in a time-sequential stereo imaging system, e.g., OLED display panel, plasma display panel, etc.). The PS is another liquid crystal device, although it covers the entire display. The PS thus has its own response time, and therefore affects the solution of the OD table equations presented above. Moreover, the response time for the PS is different, depending on whether the system is switching from the Left State to the Right State, or vice versa. Accordingly, in some embodiments, two OD tables (for each color) may be utilized, a right OD LUT optimized for viewing "right" images by the right eye, and a left OD LUT optimized for viewing "left" images by the left eye. Note that in order to operate, the system or process must be aware of which images entering it are left and which are right. This can be done in various ways, and are known to those skilled in the art. One such way is to embed metadata in the video stream indicating whether a given frame is a left or a right image frame, and this can be interpreted by whatever functional unit (processor, circuitry, etc., of the video processing component) is implementing the OD (e.g., the GPU, video scaler, display panel, etc.), although any other techniques may be used as desired.

It should be noted that the values returned from the left and right OD LUTs depend not only on the video levels for the current frame, but also on the video levels from the immediately previous frame. Thus, in general, each OD LUT is a 2-D table accessed with video level values of these two frames. Note further that in time sequential stereo display systems, the two frames refer to left and right video images (or right and left video images).

These concepts can also be applied to gamma correction, as will be described in more detail below. In other words, in some embodiments, two gamma LUTs (for each color) may be utilized, a right gamma LUT optimized for viewing "right" images by the right eye, and a left gamma LUT optimized for viewing "left" images by the left eye.

Further details regarding embodiments of the system and its functionality are described below.

Figure 9:
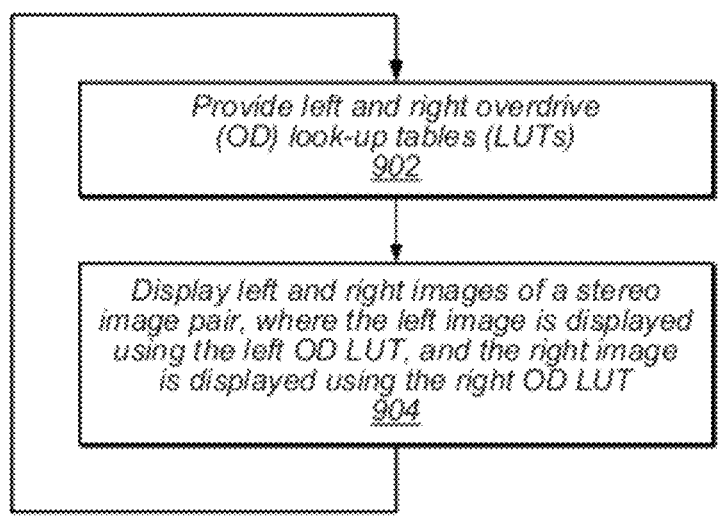
FIG. 9 is a flowchart illustrating one embodiment of a method for stereo display using multiple overdrive tables, according to one embodiment.

FIG. 9—Method for Stereo Display Using Multiple Overdrive Look-Up Tables

FIG. 9 illustrates a method for stereo display, e.g., for simulated 3D viewing, using multiple OD tables. The method shown in FIG. 9 may be used in conjunction with any of the computer systems or devices shown in the figures, among other devices. In various embodiments, some of the method elements shown may be performed concurrently, in a different order than shown, or may be omitted. In some embodiments, the method may include additional (or fewer) method elements than shown. As shown, the method may operate as follows.

In 902, a left OD LUT (overdrive look-up table) and a right OD LUT may be provided (e.g., received from a memory, another component, a server, mass storage, etc.). In some embodiments, the left and right OD LUTs may be generated. In other words, values or entries for left and right OD LUTs for use in video display may be determined, and the tables populated accordingly. The tables may be generated via any of a variety of techniques, discussed below.

In 904, left and right images of a stereo image pair may be displayed (e.g., simultaneously, or in succession), where the left image is displayed using the left OD LUT, and the right image is displayed using the right OD LUT. In other words, the method may switch between the two OD LUTs such that when the system (or method) displays a left image, the system (or method) uses the left OD LUT, and when this system (or method) displays a right image, the system (or method) uses the right OD LUT.

As indicated by the arrow, method element 904 may be repeated in an iterative manner, e.g., with successive stereo image pairs. The use of the left and right OD LUTs may improve performance of the system in that overdrive is optimized per eye (or per stereo visual channel).

Additionally, as noted above in the Background section, video levels generally include levels for multiple colors, e.g., R, G, and B sub-pixels, and so even in mono (non-stereo) systems, generally there can be multiple (e.g., three) gamma LUTs, and multiple (e.g., three) separate OD LUTS, one of each for each color, and they are at least close to operating independently.

Accordingly, in some embodiments, there may be a gamma LUT and an OD LUT (for mono systems) or a pair of OD LUTs (for stereo systems), for each color, e.g., for each type of sub-pixel, as described below in detail (see the Further Exemplary Embodiments section below).

Now, as it happens, there are values for (m,n) for which there are no acceptable solutions to the OD equations presented above, or for which the resulting values are not within some specified tolerance or error. In other words, there are values for (m,n) where the (magnitude of the) error function $\Delta(m,n)$ given above (Equation (5)) cannot be decreased to an acceptable level for some range or subset of levels (m,n).

Figure 10:
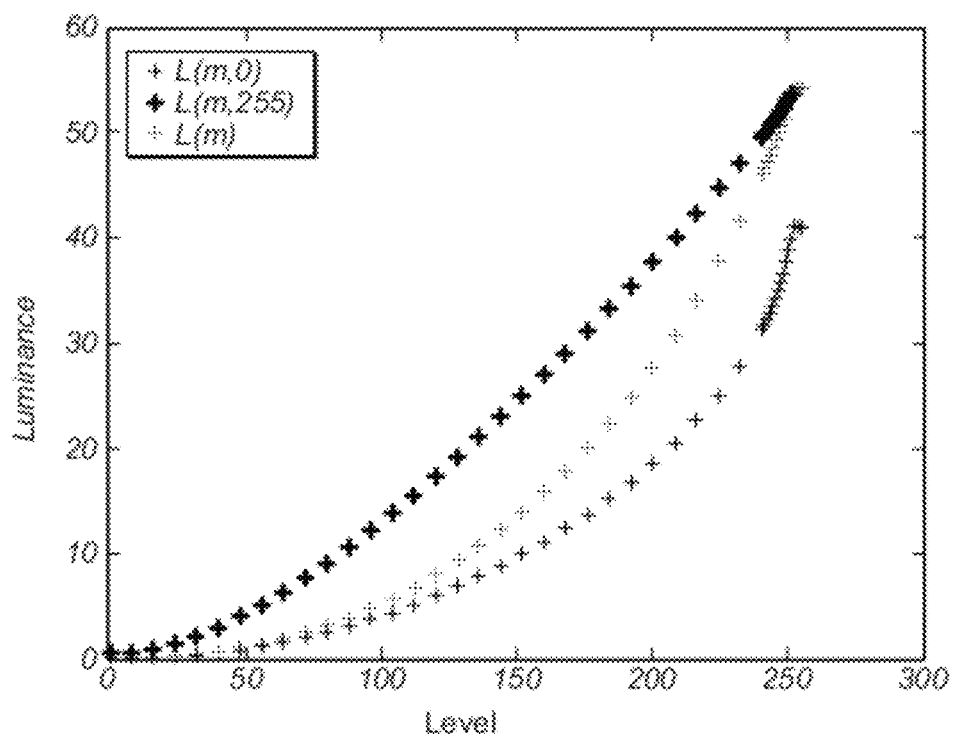
FIG. 10 illustrates three different luminance value curves as functions of video levels, according to one embodiment.

FIG. 10 illustrates three different curves: the bottom curves represents L(m,0), i.e., luminance value as a function of video level m, when the other frame video level is frozen at 0; the top curves represents L(m,255), i.e., luminance value as a function of video level m, when the other frame video level is frozen at 255 (in this case, the maximum value); and the middle curve represents L(m), which is the static luminance value as a function of m. (Note that the last entry of L(m), i.e., L(255) is also equal to L(m,m), i.e., L(255,255).)

As may be clearly seen in FIG. 10, L(255,0) is <<L(255, 255)=L(255). In other words, the bottom curve at video level m=255 is much lower than the other two curves for a wide range of values of m. This has a significant impact on the OD equations, because it means is that for m=255 and n=0, there is no acceptable solution to the OD equations. In other words, in attempting to solve the equations, one tries to find LUT entries such that L(OD(255,0), OD(0,255)) is equal to the static luminance level L(255). If the other frame video level n is frozen at level 0, then there is no such level—all of the levels are too dark.

It turns out that there are many values of (m,n) near this extreme point (255,0) where this is the case—the OD LUT equations cannot be solved within a specified error threshold (including values for which there are no solutions at all).

Figure 11:
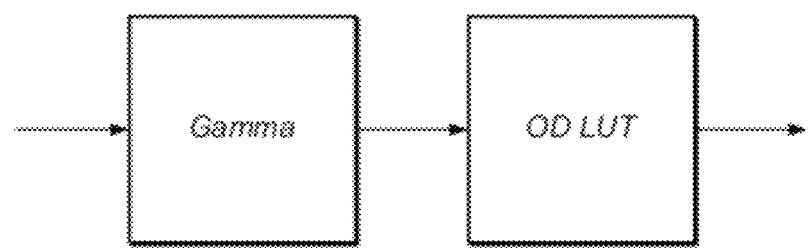
FIG. 11 illustrates a simplified block diagram of a video scaler, according to one embodiment.

However, there is a way to avoid these regions. FIG. 11 illustrates a simplified block diagram of a video processing component that implements embodiments of the constrained gamma and (stereo) overdrive functionality disclosed herein. Note that while in some embodiments, the video processing component may be implemented in or by a video scaler, in other embodiments, the video processing component may be implemented by or included in any of the devices or elements of the video chain, including one or more of the GPU, scaler, or display device (e.g., panel), or even a standalone device, among others, as desired, so long as the gamma functionality is performed prior to the overdrive functionality. Note that the video processing component may be configured to perform any of the methods disclosed herein, or any combinations of method elements thereof.

Figure 12:
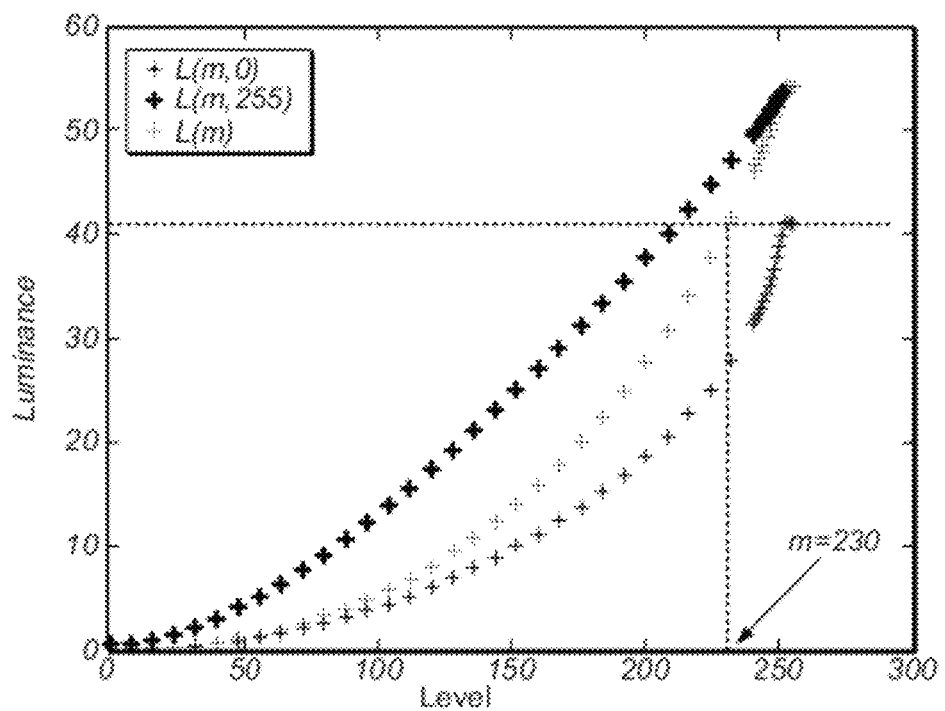
FIG. 12 illustrates the three different luminance value curves of FIG. 10, but with dashed lines indicating a maximum value constraint, according to one embodiment.

In the embodiment shown, a gamma LUT is inserted (or used) before the OD LUT, referred to herein as LUT G(m). A condition can be imposed on the gamma LUT G(m) such that there is a maximum value that it can output. For example, in one embodiment, G(255) may be set as described in FIG. 12. This is the same data shown in FIG. 10, but a horizontal line has been added at the luminance level L(255,0), as well as a vertical line dropping from the point where the horizontal line intersects the curve L(m) (the static display luminance). In this example, the vertical line occurs at the video level m=230. If the condition G(255)=230 is imposed, then all or substantially all of the levels around the point (255,0) where there is no OD LUT solution will never be used, because the system, e.g., a "Gamma block" of the system, e.g., the constrained gamma LUT G(m), may never allow such values to be passed to the OD block in the video processing component.

Figure 13:
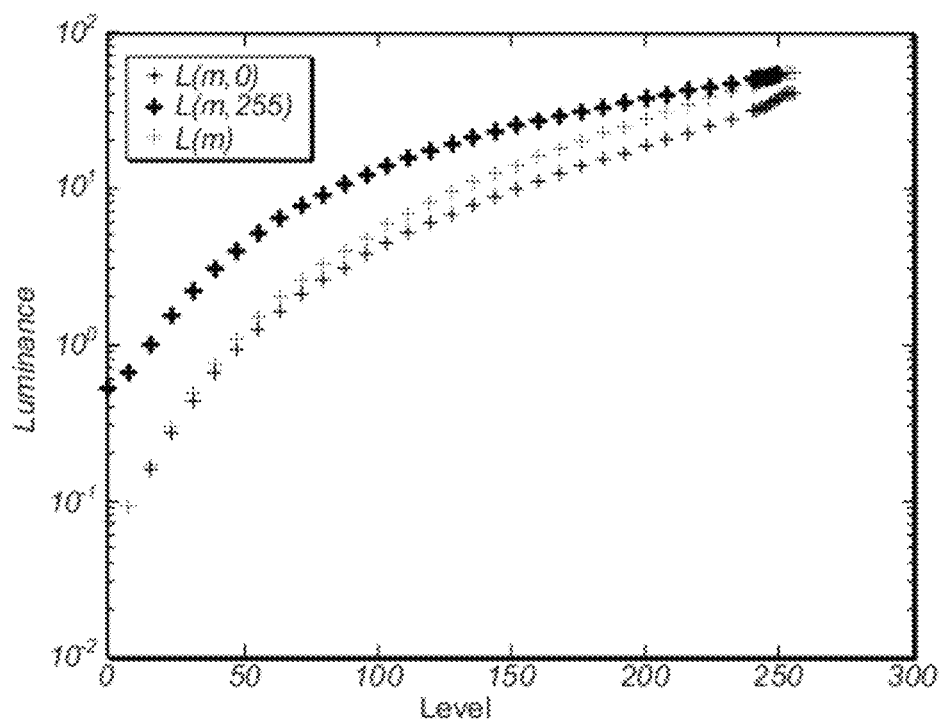
FIG. 13 illustrates the three different luminance value curves of FIG. 10 on a log scale, according to one embodiment.
Figure 14:
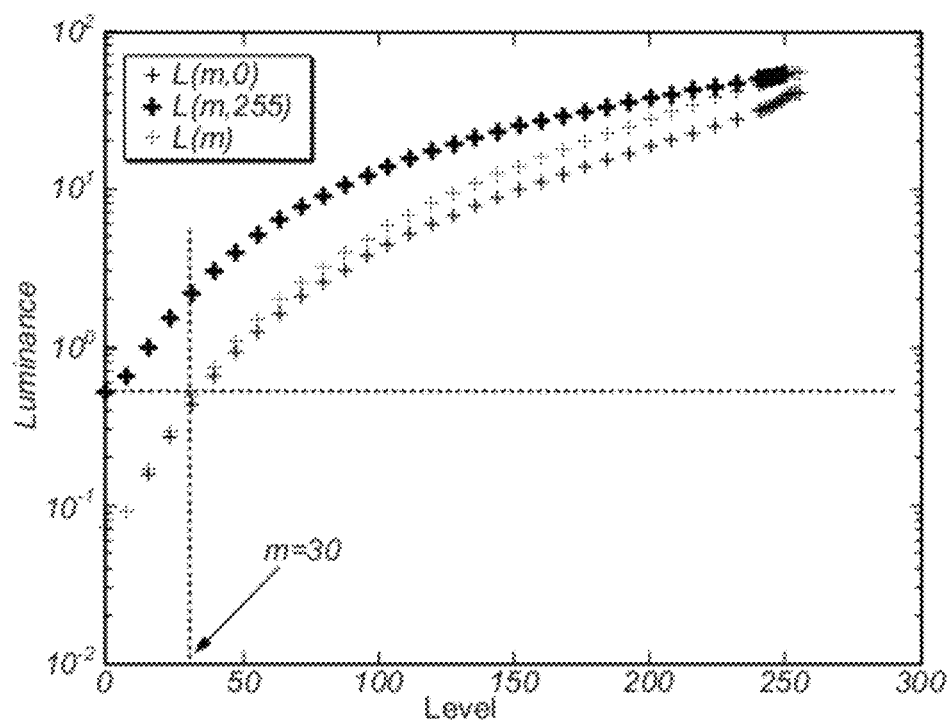
FIG. 14 illustrates the three different luminance value curves of FIG. 13, but with dashed lines indicating a minimum value constraint, according to one embodiment.

FIG. 13 illustrates that a similar problem occurs for low values of m, and shows the same data as FIGS. 10 and 11, but on a vertical log scale. As can be seen, the curve L(m,255) does not drop to as low a value as L(m,0) or L(m). Therefore, there is another region around (0,255) where there are no solutions to the OD equation. This region can be avoided in a similar manner as above. As shown in FIG. 14, if the lower level gamma value G(0) is set to 30 (in this exemplary case), then this region is excluded as well. Note that the table values may be constrained in any manner desired, e.g., via a minimum value, via a maximum value, both a minimum value and a maximum value, or even one or more interior ranges, among others.

In summary, by limiting the range over which gamma is allowed to vary before the OD LUT is applied, e.g., via a constrained gamma LUT, large regions of the OD LUT for which there is no solution, or at least no solution within a specified error, can be excluded. Note, however, that this still leaves open the question of what values to set the gamma LUT values to between these limits points. If G(0)=Gmin, and G(255)=Gmax, what are the other values of the constrained gamma LUT?

Figure 15:
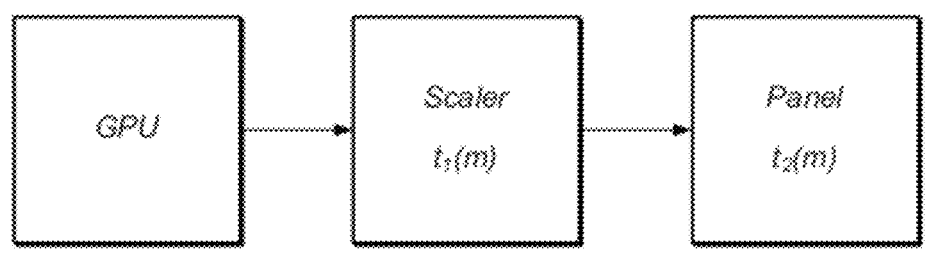
FIG. 15 illustrates a modified embodiment of the end to end video chain of FIG. 1, according to one embodiment.

Referring now to FIG. 15, which shows an exemplary (and modified) embodiment of the end to end video chain of FIG. 1, note that the scaler (or other portion of the video chain or video processing component) can insert or utilize a constrained gamma LUT (e.g., per FIG. 11) before OD. This gamma may be designated as $t_1(m)$, and in some embodiments, may be equal to, or close to, a linear ramp, as shown below. In this case, the "scaler" gamma has no effect:

$$t_1(m)=m \qquad (6)$$

Figure 16:
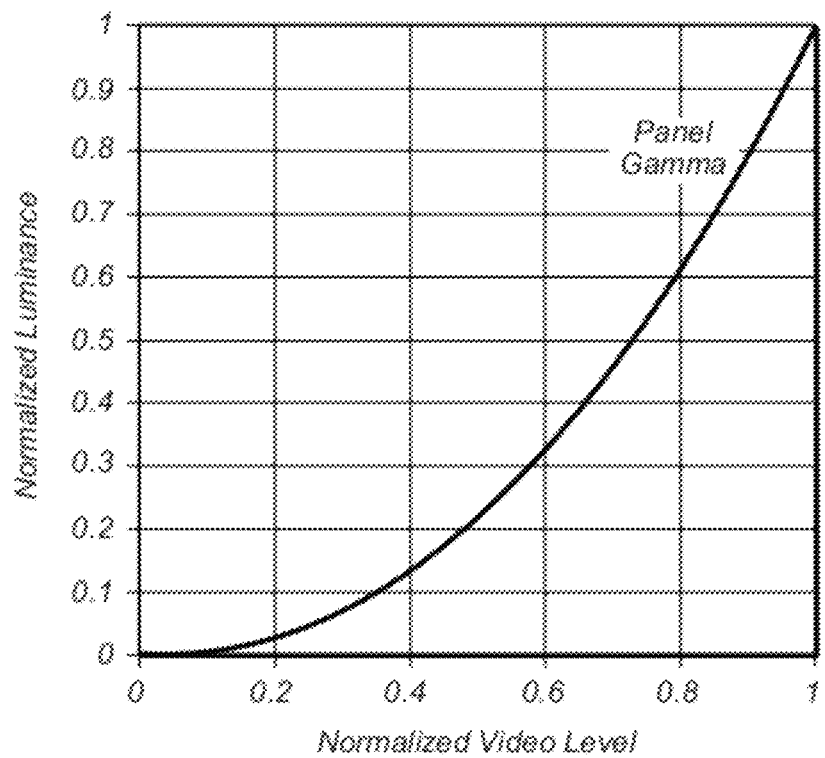
FIG. 16 illustrates an exemplary plot of normalized luminance value as a function of normalized video levels, according to one embodiment.

Note that in some embodiments, the (display) panel may have its own gamma (function or values), designated in FIG. 15 as $t_2(m)$. An exemplary version of this function may typically look like the curve shown in FIG. 16. The shape of this display gamma curve is typically chosen to give the display the best possible appearance. It may also be quite difficult to modify this function, as it may be designed into the display.

Note that once $t_1(m)$ is set to something other than a linear ramp, the overall display system may have a new overall gamma, which is $t_2(t_1(m))$, i.e., the output of $t_1(m)$ may be used to determine the gamma value for the display, i.e., the "display gamma".

Therefore, the gamma limits or constraints in the video processing component, e.g., the scaler (or other element(s)), may be imposed or implemented by changing the shape of $t_1(m)$ without changing the shape of the overall gamma $t_2(t_1(m))$ curve or function.

To see how this may be accomplished, consider the following specific example:

It is common to assume that a display gamma (function) is a simple power law of the input video level, specified by a power $\gamma$. A common value of $\gamma$ is 2.2. In this case, the following may be obtained in the absence of $t_1$:

$$t_2(m)=m^\gamma \qquad (7)$$

With $t_1$, one has instead:

$$t_2(t_1(m))=t_1(m)^\gamma=am^\gamma+b \qquad (8)$$

Here the total system gamma has been chosen to have the same functional form as the standard gamma, with the same power law, but has been modified so that output limits can be imposed. Now a and b can be solved for as follows:

First, solve for $t_1$:

$$t_1(m)=[am^\gamma+b]^{1/\gamma} \qquad (9)$$

Then impose the boundary conditions discussed above:

$$t_1(0)=[b]^{1/\gamma}=G\text{min} \qquad (10)$$

$$t_1(1)=[a+b]^{1/\gamma}=g\text{max} \qquad (11)$$

This allows a and b to be solved for as follows:

$$b=G\text{min}^\gamma \qquad (12)$$

$$a=G\text{max}^\gamma-G\text{min}^\gamma \qquad (13)$$

Figure 17:
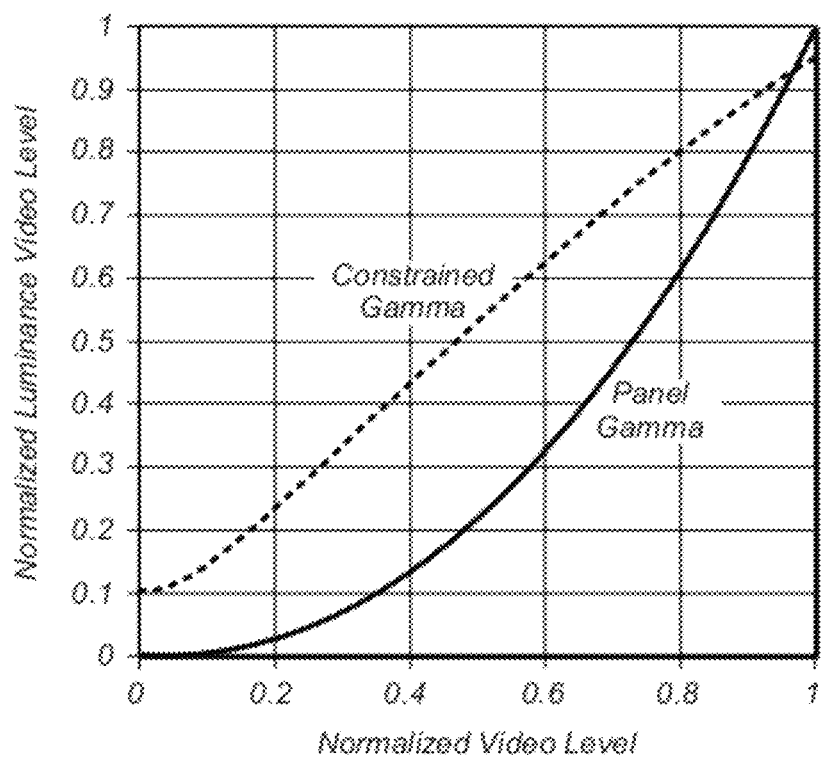
FIG. 17 illustrates an exemplary constrained gamma function, e.g., with imposed boundary constraints, according to one embodiment.

This result may produce a curve for $t_1$, an exemplary embodiment of which is shown in FIG. 17, i.e., a gamma function with imposed boundary constraints. Note that the technique described may thus result in an end to end system gamma (function) with the desired shape, but such that inputs to the OD LUT are limited so as to avoid regions of no or poor solutions. As indicated above, in some embodiments, such a curve may specify the gamma LUT.

It should be noted that there are numerous other possible ways of constructing the gamma LUT, the above being but one exemplary approach. For example, it is common in various video specifications to impose a linear ramp at the very low video levels. An example of this is the Rec. 709 video standard, wherein normalized video levels below the value of 0.081 are fit to a linear ramp rather than the power law presented above. However, in all cases, whatever form the desired system gamma takes, the above approach can be applied.

To make this clear, below is shown the general case where the function $t_2(m)$ can take any form. In this case, Equation (9) above may assume the following form:

$$t_1(m)=t_2^{-1}(am^\gamma+b) \qquad (14)$$

In Equation (14), $t_2^{-1}$ indicates the inverse of the function $t_2$, not the function raised to a power. In this way, a completely general function can be used, and the limits (or constraints) can be calculated as follows:

$$a=t_2(G\text{min}) \qquad (15)$$

$$b=t_2(G\text{max})-a \qquad (16)$$

The key idea is to impose limits Gmin and Gmax on the LUT, thereby restricting operation of the system to domains where acceptable solutions obtain. Note further that it is not necessary to impose the limits exactly as specified above. For example, it may result in a more pleasing image if these limits are somewhat relaxed, i.e., to allow some video levels through with values below Gmin or above Gmax, e.g., via specified tolerance levels. In other words, the limits may be imposed as "soft" limits, where minor violations may be tolerated.

Figure 18:
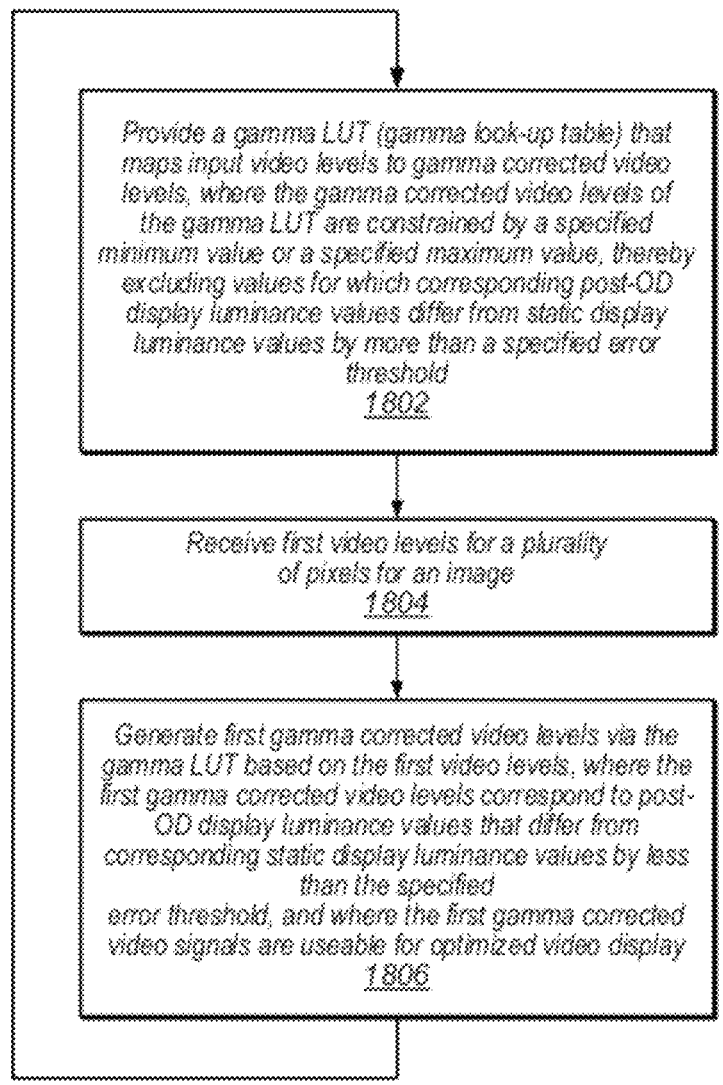
FIG. 18 is a flowchart illustrating one embodiment of a method for video display using a constrained gamma table, according to one embodiment.

FIG. 18—Method for Video Display

FIG. 18 is a flowchart illustrating one embodiment of a method for video display using a constrained gamma table, according to one embodiment. The method shown in FIG. 18 may be used in conjunction with any of the computer systems or devices shown in the figures, among other devices, including any of various types of display device, e.g., any type of pixelated panel display used in a time-sequential stereo imaging system, e.g., LCD, OLED, plasma, etc., as desired. In various embodiments, some of the method elements shown may be performed concurrently, in a different order than shown, or may be omitted. In some embodiments, the method may include additional method elements, or fewer method elements than shown. As shown, the method may operate as follows.

As shown in 1802, a gamma LUT (gamma look-up table) may be provided (or received). As with the method of claim 9, in some embodiments, the method may further include generating the gamma LUT. In other words, values or entries for the gamma LUT for use in video display may be determined, and the table populated accordingly.

In one embodiment, the gamma LUT may map input video levels to gamma corrected video levels, where the gamma corrected video levels of the gamma LUT are constrained by a specified minimum value or a specified maximum value, thereby excluding values for which corresponding post-OD display luminance values differ from static display luminance values by more than a specified error threshold.

In 1804, first video levels for a plurality of pixels for an image may be received by the video processing component, e.g., from a GPU. As noted above, the video processing component may be implemented by or included in any of the devices or elements of the video chain, including one or more of the GPU, video scaler, or display device (e.g., display panel), or even a standalone device, among others, as desired.

In 1806, first gamma corrected video levels may be generated (or determined) via the gamma LUT based on the first video levels. For example, the first video levels may be used as input to the gamma LUT, and the first gamma corrected video levels determined via table look-up (using the gamma LUT). The first gamma corrected video levels may correspond to post-OD corrected display luminance values that differ from corresponding static display luminance values by less than the specified error threshold. Additionally, since the gamma LUT excludes values for which corresponding post-OD display luminance values differ from static display luminance values by more than the specified error threshold, the first gamma corrected video levels may be used as "safe" or "effective" inputs to an OD table, i.e., outputs from the OD table based on the first gamma video levels (as input) may be guaranteed to correspond to display luminance values that differ from corresponding static display luminance values by less than the specified error threshold. Thus, the first gamma corrected video signals may be useable for optimized video display.

As indicated by the arrow, method elements 1804 and 1806 may be repeated in an iterative manner, e.g., with successive images (or, more specifically, video levels corresponding to successive images), thereby optimizing video display.

Figure 19:
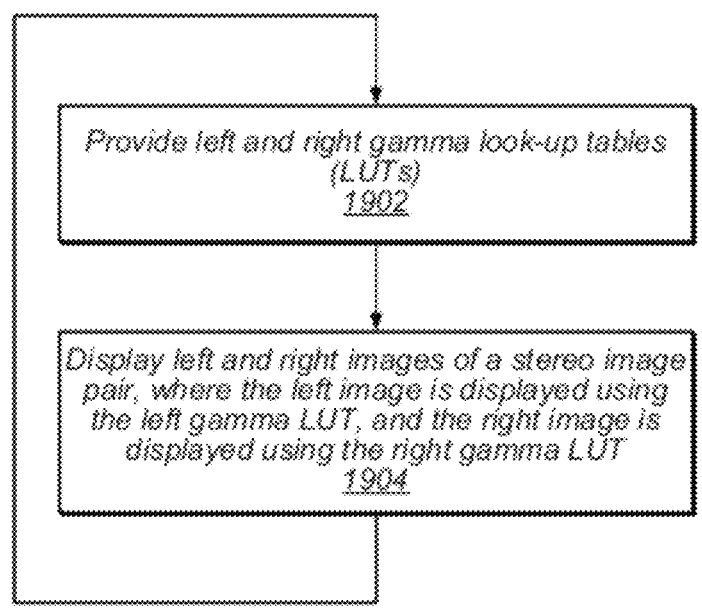
FIG. 19 is a flowchart illustrating one embodiment of a method for stereo display using multiple gamma tables, according to one embodiment.

FIG. 19—Method for Stereo Display Using Multiple Gamma Look-Up Tables

FIG. 19 illustrates a method for stereo display, e.g., for simulated 3D viewing, using multiple gamma tables. The method shown in FIG. 19 may be used in conjunction with any of the computer systems or devices shown in the figures, among other devices. In various embodiments, some of the method elements shown may be performed concurrently, in a different order than shown, or may be omitted. In some embodiments, the method may include additional (or fewer) method elements than shown. The method may be performed by the video processing component, discussed above. As shown, the method may operate as follows.

In 1902, a left gamma LUT (gamma look-up table) and a right gamma LUT may be provided. In some embodiments, the left and right gamma LUTs may be generated. In other words, values or entries for left and right gamma LUTs for use in video display may be determined, and the tables populated accordingly. The tables may be generated via any of a variety of techniques, as described above with respect to the gamma and OD LUTs.

In 1904, left and right images of a stereo image pair may be displayed (e.g., simultaneously, or in succession), where the left image is displayed using the left gamma LUT, and the right image is displayed using the right gamma LUT. In other words, the method may switch between the two gamma LUTs such that when the system (or method) displays a left image, the system (or method) uses the left gamma LUT, and when this system (or method) displays a right image, the system (or method) uses use the right gamma LUT.

For example, in one embodiment, generating first gamma corrected video levels via the gamma LUT based on the first video levels (e.g., by the video processing component) may include generating the first gamma corrected video levels via the left gamma LUT, and generating second gamma corrected video levels via the gamma LUT based on the second video levels may include generating the second gamma corrected video levels via the right gamma LUT.

As indicated by the arrow, method element 1904 may be repeated in an iterative manner, e.g., with successive stereo image pairs. The use of the left and right gamma LUTs may improve performance of the system in that gamma correction is optimized per eye (or per stereo visual channel).

Moreover, as mentioned above, video levels generally include levels for one or more additional colors, e.g., for R, G, and B (sub-)pixels, and so in some embodiments, there may be multiple, e.g., three, pairs of gamma LUTs, one (stereo) pair for each color. Additionally, in some embodiments, each of the stereo gamma LUTs may be constrained as described above.

Figure 20:
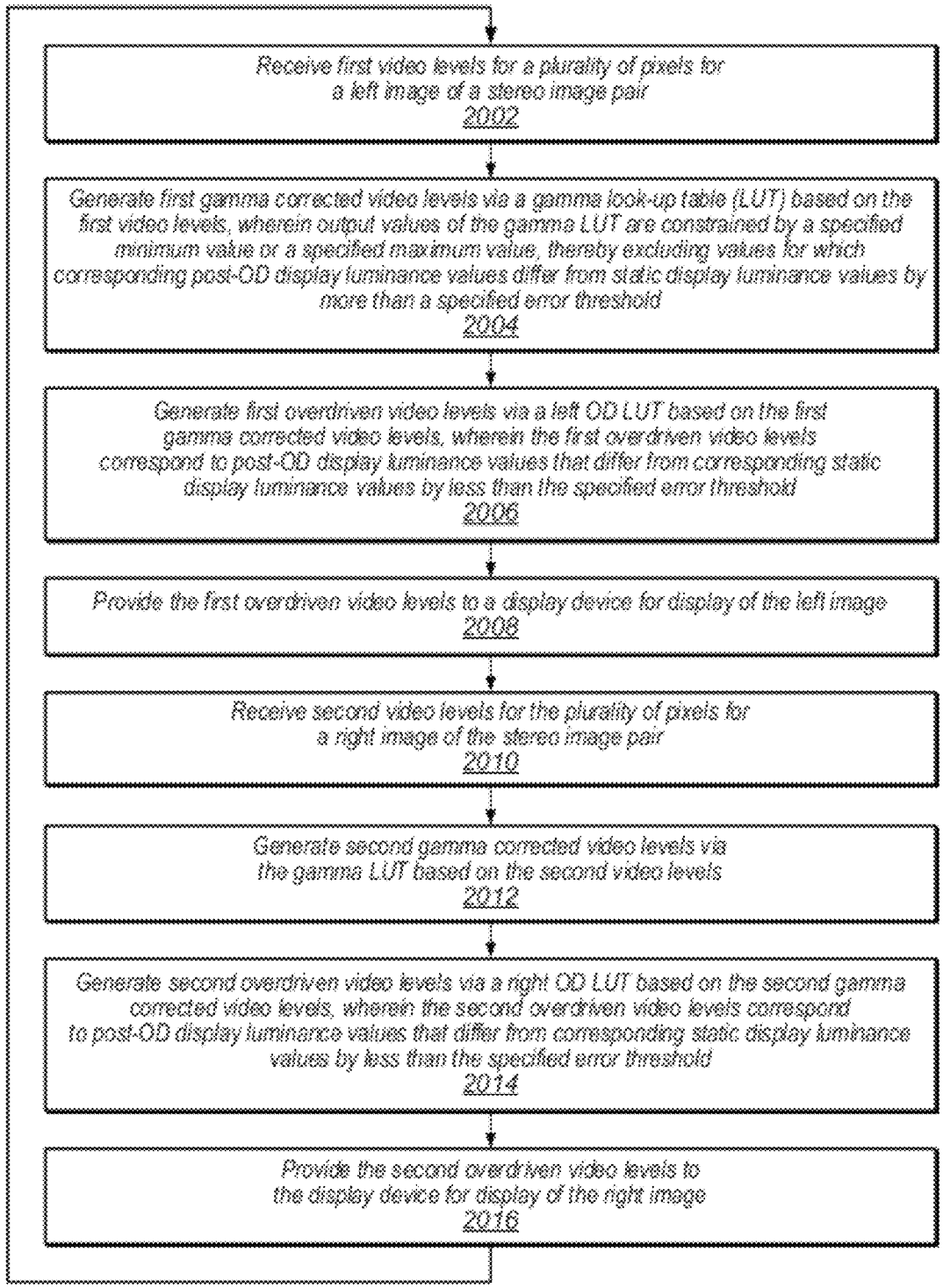
FIG. 20 is a flowchart illustrating one embodiment of a method for stereo video display, according to one embodiment.

FIG. 20—Method for Stereo Video Display

FIG. 20 flowcharts a method for stereo video display, according to some embodiments. The method shown in FIG. 20 may be used in conjunction with any of the computer systems or devices shown in the figures, among other devices. In various embodiments, some of the method elements shown may be performed concurrently, in a different order than shown, or may be omitted. In some embodiments, the method may include additional method elements, or fewer method elements than shown. In some embodiments, the method elements may be performed by the video processing component, described above. As shown, the method may operate as follows.

As shown in 2002, first video levels for a plurality of pixels for a left image of a stereo image pair may be received, e.g., from a GPU. In one embodiment, the first video levels may be received to a video processing component in a video chain, e.g., to a scaler or other portion(s) of the video chain implementing the video processing component. The video processing component may be included in a display device, e.g., a monitor, in a computer system, or even as a standalone device, as desired, and, as also indicated above, may be implemented in software, e.g., for execution by a processor and memory, or may be implemented in hardware, e.g., an ASIC or programmable hardware element, e.g., an FPGA, or any combination of the above.

In 2004, first gamma corrected video levels may be (or determined) via a gamma look-up table (LUT) based on the first video levels. Output values of the gamma LUT may be constrained by a specified minimum value or a specified maximum value ("or" is inclusive), thereby excluding values for which corresponding post-OD display luminance values differ from static display luminance values by more than a specified error threshold. Said another way, the first gamma corrected video levels may correspond to post-OD display luminance values that differ from corresponding static display luminance values by less than the specified error threshold.

In other words, as noted above with respect to the method of FIG. 18, since the gamma LUT excludes values for which corresponding post-OD display luminance values differ from static display luminance values by more than a specified error threshold, the first gamma corrected video levels may be used as "safe" or "effective" inputs to an OD table, i.e., outputs from the OD table based on the first gamma video levels (as input) may be guaranteed to correspond to display luminance values that differ from corresponding static display luminance values by less than the specified error threshold. Thus, the first gamma corrected video signals may be useable for optimized video display.

In 2006, first overdriven video levels may be (or determined) via a left OD LUT based on the first gamma corrected video levels. The first overdriven video levels may correspond to display luminance values that differ from corresponding static display luminance values by less than the specified error threshold.

In 2008, the first overdriven video levels may be provided to a display device for display of the left image. Note that in this method, the display device may be capable of stereo image display, e.g., for simulated 3D viewing. Exemplary embodiments of such a display device are described below.

In 2010, second video levels for the plurality of pixels for a right image of the stereo image pair from the GPU may be received.

In 2012, second gamma corrected video levels may be generated (or determined) via the gamma LUT based on the second video levels. As with the first gamma corrected video levels of 2004, the second gamma corrected video levels may correspond to post-OD display luminance values that differ from corresponding static display luminance values by less than the specified error threshold.

In 2014, second overdriven video levels may be generated (or determined) via a right OD LUT based on the second gamma corrected video levels. As with the first overdriven video levels of 2006, the second overdriven video levels may correspond to display luminance values that differ from corresponding static display luminance values by less than the specified error threshold.

In 2016, the second overdriven video levels may be provided to the display device for display of the right image.

As indicated by the arrow leading from 2016 back to 2002, in some embodiments, the method may include repeating method elements 2002 through 2016 one or more times in an iterative manner to display a sequence of stereo images. More explicitly, the method may repeat said receiving first video levels, said generating first gamma corrected video levels, said generating first overdriven video levels, said providing the first overdriven video levels, said receiving second video levels, said generating second gamma corrected video levels, said generating second overdriven video levels, and said providing the second overdriven video levels, one or more times in an iterative manner to display a sequence of stereo images.

Further Exemplary Embodiments

In one embodiment of the method of FIG. 20, dual or stereo gamma tables may be used, e.g., as described above with respect to the method of FIG. 19. Thus, in one exemplary embodiment (with three colors), the method may utilize 6 gamma LUTs (left and right gamma LUTs for each of the three colors or color channels) and 6 OD LUTs (left and right OD LUTs for each of the three colors).

In other embodiments, the above techniques may be applied with different color models besides the RGB model, such as, but not limited to, HSV or HSL representations, or CMYK, among others. Accordingly, the number and types of tables utilized may be different, depending on the number and types of colors or color channels supported. Alternatively, in some embodiments, the same tables may be used for all the colors, e.g., a left OD LUT for all colors, a right OD LUT for all colors, etc.

Thus, in some embodiments of the method of FIG. 20, each of the first and second video levels may include respective color video levels for respective color sub-pixels. The gamma LUT may be a first gamma LUT for first color video levels, the left OD LUT may be a first left OD LUT for the first color video levels, and the right OD LUT may be a first right OD LUT for the first color video levels. Accordingly, the generating first gamma corrected video levels, the generating first overdriven video levels, the providing the first overdriven video levels, the generating second gamma corrected video levels, the generating second overdriven video levels, and the providing the second overdriven video levels, may be with respect to the first color video levels.

Now, to process the additional colors (or color channels), one or more additional gamma look-up tables (LUTs) may be provided (or received) for respective one or more additional color video levels. As with the first gamma LUT, each additional gamma LUT may map respective input color video levels to respective gamma corrected color video levels, where the respective gamma corrected color video levels are constrained by the specified minimum value or the specified maximum value, thereby excluding values for which corresponding post-OD display luminance values differ from static display luminance values by more than the specified error threshold. Similarly, one or more additional left OD LUTs may be provided for the respective one or more additional color video levels, as well as one or more additional right OD LUTs for the respective one or more additional color video levels.

The method may then utilize these one or more additional LUTs to process these additional colors (or color channels). More specifically, the method may include performing said receiving first video levels, said generating first gamma corrected video levels, said generating first overdriven video levels, said providing the first overdriven video levels, said receiving second video levels, said generating second gamma corrected video levels, said generating second overdriven video levels, said providing the second overdriven video levels, and said repeating, with respect to each of the respective one or more additional color video levels using the respective one or more additional gamma LUTs, the respective one or more additional left OD LUTs, and the respective one or more additional right OD LUTs, e.g., via the video processing component.

As noted above, in some embodiments, the system may include a display device. In one exemplary embodiment, the display device may be or include a display panel and a polarization switch (PS), Note that the display panel used may be any LCD or any other type of pixelated panel display used in a time-sequential stereo imaging system, e.g., OLED, plasma, etc. The display device may be configured to display the left image on the display panel with the PS set to a first state, where the left image comprises light in a first polarized state, and display the right image on the display panel with the PS set to a second state, wherein the right image comprises light in a second polarized state, wherein the second polarized state is orthogonal to the first polarized state. In other words, in some embodiments, the method may invoke display of the left image on the display panel with the PS set to the first state, where the left image includes light in the first polarized state, and invoke display of the right image on the display panel with the PS set to the second state, where the right image includes light in the second polarized state, where the second polarized state is orthogonal to the first polarized state.

Note that any orthogonal polarized state pairs may be used as desired. For example, in one embodiment, the first and second polarized states may be or include orthogonal linear polarization states. In other embodiments, the first and second polarization states may be or include orthogonal circular polarization states. As further examples, combinations of such states may also be used, i.e., orthogonal elliptical polarization states.

In some embodiments, the system may also include eyewear. For example, in one embodiment, the system may include a panel display, and the eyewear may include a left shutter, a right shutter, and a shutter switch (SS) configured to switchably open and close the left shutter or the right shutter, thereby blocking one (or the other) eye's view of the panel display. The method may include displaying (or invoking display of) the left image to a user by opening the left shutter and closing the right shutter, and displaying (or invoking display of) the right image to the user by opening the right shutter and closing the left shutter.

It should be noted that the above-described embodiments are exemplary only, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A system, comprising:
a video processing component; and
a memory, comprised in or coupled to the video processing component, wherein the memory stores:
a gamma look-up table (LUT) that maps input video levels to gamma corrected video levels wherein the gamma corrected video levels of the gamma LUT are constrained by a specified minimum value and a specified maximum value, thereby excluding values for which corresponding post-overdriven (post-OD) display luminance values differ from static display luminance values beyond a specified error threshold;
at least one OD LUT;
wherein the video processing component is configured to:
receive video levels for a plurality of pixels for an image;
generate gamma corrected video levels via the gamma LUT based on the video levels, wherein the gamma corrected video levels correspond to post-OD display luminance values that differ from corresponding static display luminance values within the specified error threshold, thereby excluding values with no OD LUT solution;
after generating the gamma corrected video levels, generate overdriven video levels via the at least one OD LUT based on the generated gamma corrected video levels, wherein the overdriven video levels correspond to post-OD display luminance values that differ from corresponding static display luminance values within the specified error threshold;
provide the overdriven video levels to a display device for display of the image; and
repeat said receive video levels, said generate gamma corrected video levels, said generate overdriven video levels, and said provide the overdriven video levels, one or more times in an iterative manner to display a sequence of images.

2. The system of claim 1,
wherein each of the video levels comprises respective color video levels for respective color sub-pixels, wherein the gamma LUT is a first gamma LUT for first color video levels, wherein the at least one OD LUT is a first OD LUT for the first color video levels, and wherein said generate gamma corrected video levels, said generate overdriven video levels, said provide the overdriven video levels, are with respect to the first color video levels;
wherein the memory further stores:
one or more additional gamma look-up tables (LUTs) for respective one or more additional color video levels that each maps respective input color video levels to respective gamma corrected color video levels, wherein the respective gamma corrected color video levels are constrained by the specified minimum value and the specified maximum value, thereby excluding values for which corresponding post-OD display luminance values differ from static display luminance values beyond the specified error threshold;
one or more additional OD LUTs for the respective one or more additional color video levels; and
wherein the video processing component is further configured to perform said generate gamma corrected video levels, said generate overdriven video levels, said provide the overdriven video levels, and said repeat, with respect to each of the respective one or more additional color video levels using the respective one or more additional gamma LUTs, and the respective one or more additional OD LUTs.

3. The system of claim 1,
wherein the image is a stereo image comprising a stereo image pair;
wherein to receive video levels for a plurality of pixels for an image, the video processing component is configured to:
receive first video levels for the plurality of pixels for a left image of the stereo image; and
receive second video levels for the plurality of pixels for a right image of the stereo image;

wherein to generate gamma corrected video levels via the gamma LUT based on the video levels, the video processing component is configured to:
generate first gamma corrected video levels via the gamma LUT based on the first video levels; and
generate second gamma corrected video levels via the gamma LUT based on the second video levels;
wherein the at least one OD LUT comprises a left OD LUT and a right OD LUT;
wherein to generate overdriven video levels, the video processing component is configured to:
generate first overdriven video levels via the left OD LUT based on the first gamma corrected video levels, wherein the first overdriven video levels correspond to post-OD display luminance values that differ from corresponding static display luminance values beyond the specified error threshold; and
generate second overdriven video levels via the right OD LUT based on the second gamma corrected video levels, wherein the second overdriven video levels correspond to post-OD display luminance values that differ from corresponding static display luminance values beyond the specified error threshold; and
wherein to provide the overdriven video levels to a display device for display of the image, the video processing component is configured to:
provide the first overdriven video levels to a display device for display of the left image; and
provide the second overdriven video levels to a display device for display of the right image.

4. The system of claim 3,
wherein the gamma LUT comprises:
a left gamma LUT; and
a right gamma LUT;
wherein to generate first gamma corrected video levels via the gamma LUT based on the first video levels, the video processing component is configured to:
generate the first gamma corrected video levels via the left gamma LUT; and
wherein to generate second gamma corrected video levels via the gamma LUT based on the second video levels, the video processing component is configured to:
generate the second gamma corrected video levels via the right gamma LUT.

5. The system of claim 3, further comprising the display device, wherein the display device comprises a display panel and a polarization switch (PS), wherein the display device is configured to:
display the left image on the display panel with the PS set to a first state, wherein the left image comprises light in a first polarization state; and
display the right image on the display panel with the PS set to a second state, wherein the right image comprises light in a second polarization state, wherein the second polarization state is orthogonal to the first polarization state.

6. The system of claim 5, wherein the first and second polarization states comprise orthogonal linear polarization states.

7. The system of claim 5, wherein the first and second polarization states comprise orthogonal circular polarization states.

8. The system of claim 3, further comprising the display device, wherein the display device comprises:
a display panel; and
eyewear, comprising:
a left shutter;
a right shutter; and
a shutter switch (SS) configured to switchably open and close the left shutter or the right shutter;
wherein the display device is configured to:
display the left image to a user by opening the left shutter and closing the right shutter; and
display the right image to the user by opening the right shutter and closing the left shutter.

9. The system of claim 1, further comprising the display device, wherein the display device comprises;
an LCD display;
an OLED (organic light emitting diode); or
a plasma display.

10. The system of claim 1, wherein the video processing component is comprised in one or more of:
a graphics process unit (GPU);
a video scaler; or
a display device.

11. A non-transitory computer accessible memory medium, configured with program instructions executable by a processor to implement:
a gamma look-up table (LUT) that maps input video levels to gamma corrected video levels wherein the gamma corrected video levels of the gamma LUT are constrained by a specified minimum value and a specified maximum value, thereby excluding values for which corresponding post-overdriven (post-OD) display luminance values differ from static display luminance values beyond a specified error threshold;
at least one OD LUT;
wherein the program instructions are further executable to:
receive video levels for a plurality of pixels for an image;
generate gamma corrected video levels via the gamma LUT based on the video levels, thereby excluding values with no OD LUT solution;
after generating the gamma corrected video levels, generate overdriven video levels via the OD LUT based on the generated gamma corrected video levels, wherein the overdriven video levels correspond to display luminance values that differ from corresponding static display luminance values within the specified error threshold;
provide the overdriven video levels to a display device for display of the image; and
repeat said receive video levels, said generate gamma corrected video levels, said generate overdriven video levels, said provide the overdriven video levels, one or more times in an iterative manner to display a sequence of images.

12. The non-transitory computer accessible memory medium of claim 11,
wherein each of the video levels comprises respective color video levels for respective color sub-pixels, wherein the gamma LUT is a first gamma LUT for first color video levels, wherein the at least one OD LUT is a first OD LUT for the first color video levels;
wherein said generate gamma corrected video levels, said generate overdriven video levels, and said provide the overdriven video levels are with respect to the first color video levels; and wherein the program instructions are further executable to:
perform said generate gamma corrected video levels, said generate overdriven video levels, said provide the overdriven video levels, said generate gamma corrected video levels, and said repeat with respect to each of the respective one or more additional color video levels using the respective one or more additional gamma LUTs, and the respective one or more additional OD LUTs.

13. The non-transitory computer accessible memory medium of claim 11,
wherein the image is a stereo image comprising a stereo image pair;
wherein to receive video levels for a plurality of pixels for an image, the program instructions are executable to:
receive first video levels for the plurality of pixels for a left image of the stereo image; and
receive second video levels for the plurality of pixels for a right image of the stereo image;
wherein the at least one OD LUT comprises a left OD LUT and a right OD LUT;
wherein to generate gamma corrected video levels via the gamma LUT based on the video levels, the video processing component is configured to:
generate first gamma corrected video levels via the gamma LUT based on the first video levels; and
generate second gamma corrected video levels via the gamma LUT based on the second video levels;
wherein to generate overdriven video levels, the video processing component is configured to:
generate first overdriven video levels via the left OD LUT based on the first gamma corrected video levels, wherein the first overdriven video levels correspond to post-OD display luminance values that differ from corresponding static display luminance values beyond the specified error threshold; and
generate second overdriven video levels via the right OD LUT based on the second gamma corrected video levels, wherein the second overdriven video levels correspond to post-OD display luminance values that differ from corresponding static display luminance values beyond the specified error threshold; and
wherein to provide the overdriven video levels to a display device for display of the image, the video processing component is configured to:
provide the first overdriven video levels to a display device for display of the left image; and
provide the second overdriven video levels to a display device for display of the right image.

14. The non-transitory computer accessible memory medium of claim 13,
wherein the gamma LUT comprises:
a left gamma LUT; and
a right gamma LUT;
wherein to generate first gamma corrected video levels via the gamma LUT based on the first video levels, the program instructions are executable to:
generate the first gamma corrected video levels via the left gamma LUT; and
wherein said to generate second gamma corrected video levels via the gamma LUT based on the second video levels, the program instructions are executable to:
generate the second gamma corrected video levels via the right gamma LUT.

15. The non-transitory computer accessible memory medium of claim 13, wherein the display device comprises a liquid crystal (LC) display with a polarization switch (PS), and wherein the program instructions are further executable to:
invoke display of the left image on the LC display with the PS set to a first state, wherein the left image comprises light in a first polarization state; and
invoke display of the right image on the LC display with the PS set to a second state, wherein the right image comprises light in a second polarization state, wherein the second polarization state is orthogonal to the first polarization state.

16. The non-transitory computer accessible memory medium of claim 15, wherein the first and second polarization states comprise orthogonal linear polarization states.

17. The non-transitory computer accessible memory medium of claim 15, wherein the first and second polarization states comprise orthogonal circular polarization states.

18. The non-transitory computer accessible memory medium of claim 13, wherein the display device comprises:
a display panel; and
eyewear, comprising:
a left shutter;
a right shutter; and
a shutter switch (SS) configured to switchably open and close the left shutter or the right shutter; and
wherein the program instructions are further executable to:
invoke display of the left image to a user by opening the left shutter and closing the right shutter; and
invoke display of the right image to the user by opening the right shutter and closing the left shutter.

19. The non-transitory computer accessible memory medium of claim 11, wherein the display device comprises;
an LCD display;
an OLED (organic light emitting diode); or
a plasma display.

20. A method, comprising:
receiving video levels for a plurality of pixels for an image;
generating gamma corrected video levels via a gamma look-up table (LUT) based on the video levels, wherein output values of the gamma LUT are constrained by a specified minimum value and a specified maximum value, thereby excluding values for which corresponding post-overdriven (post-OD) display luminance values differ from static display luminance values beyond a specified error threshold, thereby excluding values with no OD LUT solution;
after generating the gamma corrected video levels, generating overdriven video levels via at least one OD LUT based on the generated gamma corrected video levels, wherein the overdriven video levels correspond to display luminance values that differ from corresponding static display luminance values within the specified error threshold;
providing the overdriven video levels to a display device for display of the image; and
repeating said receiving video levels, said generating gamma corrected video levels, said generating overdriven video levels, and said providing the overdriven video levels, one or more times in an iterative manner to display a sequence of images.

21. The method of claim 20,
wherein the image is a stereo image comprising a stereo image pair;

wherein said receiving video levels comprises:
- receiving first video levels for a plurality of pixels for a left image of the stereo image pair; and
- receiving second video levels for the plurality of pixels for a right image of the stereo image pair;

wherein said generating gamma corrected video levels via the gamma LUT based on the video levels comprises:
- generating first gamma corrected video levels via the gamma LUT based on the first video levels; and
- generating second gamma corrected video levels via the gamma LUT based on the second video levels;

wherein said generating overdriven video levels via at least one OD LUT based on the gamma corrected video levels comprises:
- generating first overdriven video levels via a left OD LUT based on the first gamma corrected video levels;
- generating second overdriven video levels via a right OD LUT based on the second gamma corrected video levels;

wherein said providing the overdriven video levels to a display device for display of the image comprises:
- providing the first overdriven video levels to the display device for display of the left image; and
- providing the second overdriven video levels to the display device for display of the right image; and wherein said repeating comprises:
- repeating said receiving first video levels, said generating first gamma corrected video levels, said generating first overdriven video levels, said providing the first overdriven video levels, said receiving second video levels, said generating second gamma corrected video levels, said generating second overdriven video levels, said providing the second overdriven video levels, one or more times in an iterative manner to display a sequence of stereo images.

* * * * *